United States Patent
He et al.

(10) Patent No.: US 9,959,606 B2
(45) Date of Patent: May 1, 2018

(54) METHOD FOR ACQUIRING HISTOGRAM, METHOD FOR DYNAMICALLY ADJUSTING LUMINANCE AND IMAGE PROCESSING APPARATUS

(71) Applicant: SHENZHEN TCL NEW TECHNOLOGY CO., LTD, Shenzhen, Guangdong (CN)

(72) Inventors: Peng He, Guangdong (CN); Dong Wen, Guangdong (CN)

(73) Assignee: SHENZHEN TCL NEW TECHNOLOGY CO., LTD, Shenzhen (CN)

( * ) Notice: Subject to any disclaimer, the term of this patent is extended or adjusted under 35 U.S.C. 154(b) by 55 days.

(21) Appl. No.: 15/026,964

(22) PCT Filed: Dec. 11, 2014

(86) PCT No.: PCT/CN2014/093635
§ 371 (c)(1),
(2) Date: Apr. 2, 2016

(87) PCT Pub. No.: WO2016/008259
PCT Pub. Date: Jan. 21, 2016

(65) Prior Publication Data
US 2016/0260203 A1    Sep. 8, 2016

(30) Foreign Application Priority Data
Jul. 16, 2014   (CN) .......................... 2014 1 0340272

(51) Int. Cl.
*G06K 9/00*    (2006.01)
*G06T 5/40*    (2006.01)
(Continued)

(52) U.S. Cl.
CPC .............. *G06T 5/40* (2013.01); *G06K 9/4661* (2013.01); *G06T 5/007* (2013.01); *G06T 5/009* (2013.01);
(Continued)

(58) Field of Classification Search
None
See application file for complete search history.

(56) References Cited

U.S. PATENT DOCUMENTS

| 700,668 | A | * | 5/1902 | Pate .......................... B01D 9/00 100/122 |
| 5,003,394 | A | * | 3/1991 | Lagoni ..................... H04N 5/20 348/673 |

(Continued)

FOREIGN PATENT DOCUMENTS

CN    103093429 A    5/2013

OTHER PUBLICATIONS

Adaptive contrast enhancement using local region stretching, S. Srinivasan et al. Proc of ASID, 2006, pp. 152-155.*
(Continued)

*Primary Examiner* — Jayesh A Patel

(57) ABSTRACT

The present invention discloses a method for acquiring a histogram, wherein the method for acquiring a histogram includes the following steps: acquiring luminance data of pixel points of a dynamic video image; and performing separate statistical processing on frequencies of first luminance data with the minimum luminance value and second luminance data with the maximum luminance value in the luminance data, to draw a first histogram corresponding to the luminance data after the statistical processing. The present invention further discloses a method for dynamically adjusting luminance and an image processing apparatus. The
(Continued)

present invention can embody features of image quality more accurately and more comprehensively.

4 Claims, 6 Drawing Sheets

(51) Int. Cl.
G06K 9/46 (2006.01)
G06T 5/00 (2006.01)
(52) U.S. Cl.
CPC ........... G06T 2207/10016 (2013.01); G06T 2207/20208 (2013.01)

(56) References Cited

U.S. PATENT DOCUMENTS

| | | | | |
|---|---|---|---|---|
| 6,771,795 B1* | 8/2004 | Isnardi | ............... | G06T 1/0071 348/463 |
| 6,947,169 B2* | 9/2005 | Nitta | .................. | H04N 1/40 345/670 |
| 7,760,961 B2* | 7/2010 | Moldvai | ............... | G06T 5/009 382/162 |
| 7,835,588 B2* | 11/2010 | Parkkinen | ............... | G06T 5/009 382/168 |
| 8,005,303 B2* | 8/2011 | Cote | ................... | G06T 9/00 345/634 |
| 9,311,561 B2* | 4/2016 | Hong | ................... | H04N 5/217 |
| 9,607,364 B2* | 3/2017 | Xu | ....................... | G06T 5/007 |
| 2005/0254707 A1* | 11/2005 | Takahashi | ............ | G06T 5/009 382/169 |
| 2006/0083425 A1* | 4/2006 | Moldvai | ............... | G06T 5/009 382/169 |
| 2006/0268180 A1* | 11/2006 | Chou | ................... | G06T 5/009 348/673 |
| 2007/0104387 A1* | 5/2007 | Han | ....................... | G06T 5/009 382/271 |
| 2007/0172145 A1* | 7/2007 | Altunbasak | ........... | G06T 5/009 382/274 |
| 2008/0037868 A1* | 2/2008 | Han | ....................... | G06T 5/009 382/169 |
| 2009/0087092 A1* | 4/2009 | Min | ....................... | G06T 5/009 382/169 |
| 2011/0285911 A1* | 11/2011 | Astrachan | ............... | H04N 5/57 348/659 |
| 2011/0285913 A1* | 11/2011 | Astrachan | ............... | H04N 5/57 348/687 |
| 2012/0051637 A1* | 3/2012 | Morimoto | .............. | G06T 5/009 382/169 |
| 2012/0304763 A1* | 12/2012 | Troxler | ................. | G01B 11/00 73/32 R |
| 2013/0019196 A1* | 1/2013 | Bhatt | ..................... | G06F 3/048 715/771 |
| 2013/0084005 A1* | 4/2013 | Min | .................... | H04N 1/4074 382/168 |
| 2014/0307117 A1* | 10/2014 | Feng | ................... | H04N 5/2355 348/218.1 |

OTHER PUBLICATIONS

International Search Report of PCT Patent Application No. PCT/CN2014/093635 dated Apr. 16, 2015.

* cited by examiner

METHOD FOR ACQUIRING HISTOGRAM, METHOD FOR DYNAMICALLY ADJUSTING LUMINANCE AND IMAGE PROCESSING APPARATUS

BACKGROUND

Technical Field

The present invention relates to the field of image processing technologies, and in particular, to a method for acquiring a histogram, a method for dynamically adjusting luminance and an image processing apparatus.

Related Art

As shown in FIG. 1, the existing histogram drawing method is as follows:

1. Collect data: M statistics X values are collected.
2. Determine a data range (R): the maximum value and the minimum value defined of are respectively set as X(max) and X(min); if the minimum unit amount of X is ΔX=2a>0, R=X(max)−X(min)+ΔX.
3. Determine a class interval (h): a class number of a histogram is determined at first, then the range is divided by the class number, and the width of each class of the histogram can be obtained, that is, the class interval. In this example, the class number is set as N, the class interval h=R/N. The class number should be determined properly, wherein if the class number is too small, it will lead to a greater calculation error; if the class number too much, it will affect prominence of a data grouping rule and increase the cost of and may increase the work load of calculation and affect a response speed.
4. Determine a boundary value of each class: to be able to make statistics on all the X values, a lower limiting value of the first class and an upper limiting value of the Nth class comparatively spatial, respectively being X(min)−a and X(max)+a. An upper limiting value of the first class is the lower limiting value of the first class plus the range, is, X(min)−a+h; and a lower limiting value of the second class is the upper limiting value of the first class, an upper limiting value of the second class is the lower limiting value of the second class plus the range, that is, X(min)−a+2h, and boundaries of respective classes are deduced by such analogy.
5. Draw out a frequency distribution table: statistics is made on the M X values, which are listed into corresponding classes according to sizes, and finally frequencies of each class of X values are calculated, the frequencies are set as $P_i$, wherein i=1, 2 . . . N, and the following equation needs to be satisfied:

$$\sum_{i=1}^{N} P_i = M,$$

As shown by the following Table 1, the existing histogram statistic:

TABLE 1

| Statistical bar number | Statistical rule (condition) | Frequency distribution |
| --- | --- | --- |
| 1 | X (min) − a < X < X (min) − a + h | $P_1$ |
| 2 | X (min) − a + h < X < X (min) − a + 2h | $P_2$ |
| ... | ... | ... |
| N | X (min) − a + (N − 1)h < X < X (max) + a | $P_N$ |

6. Generate a histogram: a horizontal ordinate X and a vertical ordinate $P_i$ are drawn respectively according to a scale of data value, and the height of each statistical bar is drawn according to the vertical ordinate.

The histogram drawn according to the aforementioned method has defects, that is, when applied to data statistics in the field of image processing, the histogram cannot reflect features of image quality more accurately and more comprehensively if a user has higher requirements for precision of image quality processing.

The above contents are merely used for assisting in understanding the technical solution of the present invention, which does not mean admitting that the above contents are prior arts.

SUMMARY

A main objective of the present invention is to solve the technical problem in the prior arts that the histogram drawn cannot embody features of image quality more accurately and more comprehensively.

To achieve the foregoing objective, the present invention provides a method for acquiring a histogram, wherein the method for acquiring a histogram includes the following steps:

acquiring luminance data of pixel points of a dynamic video image; and performing separate statistical processing on frequencies of first luminance data with the minimum luminance value and second luminance data with the maximum luminance value in the luminance data, to draw a first histogram corresponding to the luminance data after the statistical processing.

Preferably, the step of performing separate statistical processing on frequencies of first luminance data with the minimum luminance value and second luminance data with the maximum luminance value in the luminance data, to draw a first histogram corresponding to the luminance data after the statistical processing includes:

expanding a luminance range of the luminance data;

performing separate statistical processing on the frequencies of the first luminance data and the second luminance data, and performing frequency statistics processing on other luminance data except the first luminance data and the second luminance data according to a preset condition;

drawing a second histogram corresponding to the luminance data after the frequency statistics processing; and removing first luminance data in the first statistical bar in the second histogram, and removing second luminance data in the last statistical bar, to obtain the first histogram.

Preferably, the step of expanding a luminance range of the luminance data includes:

decreasing the minimum luminance value and increasing the maximum luminance value, or decreasing the minimum luminance value, or increasing the maximum luminance value.

Preferably, the step of performing separate statistical processing on frequencies of first luminance data with the minimum luminance value and second luminance data with the maximum luminance value in the luminance data, to draw a first histogram corresponding to the luminance data after the statistical processing includes:

narrowing a luminance range of the luminance data;

performing separate statistical processing on the frequencies of the first luminance data and the second luminance data, and performing frequency statistics processing on the luminance data after narrowing according to a preset condition; and drawing a first histogram corresponding to the luminance data after the frequency statistics processing.

Preferably, the step of narrowing a luminance range of the luminance data includes:

increasing the minimum luminance value and decreasing the maximum luminance value, or increasing the minimum luminance value, or decreasing the maximum luminance value.

In addition, to achieve the foregoing objective, the present invention further provides a method for dynamically adjusting luminance, wherein the method for dynamically adjusting luminance includes the following steps:

acquiring luminance data of pixel points of a dynamic video image;

performing separate statistical processing on frequencies of first luminance data with the minimum luminance value and second luminance data with the maximum luminance value in the luminance data, to draw a first histogram corresponding to the luminance data after the statistical processing;

acquiring a main distribution range of luminance according to the first histogram; and level-stretching luminance of the dynamic video image according to the first histogram and the main distribution range.

Preferably, the step of performing separate statistical processing on frequencies of first luminance data with the minimum luminance value and second luminance data with the maximum luminance value in the luminance data, to draw a first histogram corresponding to the luminance data after the statistical processing includes:

expanding a luminance range of the luminance data;

performing separate statistical processing on the frequencies of the first luminance data and the second luminance data, and performing frequency statistics processing on other luminance data expect the first luminance data and the second luminance data according to a preset condition;

generating a second histogram corresponding to the luminance data after the frequency statistics processing; and removing first luminance data in the first statistical bar in the second histogram, and removing second luminance data in the last statistical bar, to obtain the first histogram.

Preferably, the step of expanding a luminance range of the luminance data includes:

decreasing the minimum luminance value and increasing the maximum luminance value, or decreasing the minimum luminance value, or increasing the maximum luminance value.

Preferably, the step of performing separate statistical processing on frequencies of first luminance data with the minimum luminance value and second luminance data with the maximum luminance value in the luminance data, to draw a first histogram corresponding to the luminance data after the statistical processing includes:

narrowing a luminance range of the luminance data;

performing separate statistical processing on the frequencies of the first luminance data and the second luminance data, and performing frequency statistics processing on the luminance data after narrowing according to a preset condition; and generating a first histogram corresponding to the luminance data after the frequency statistics processing.

Preferably, the step of narrowing a luminance range of the luminance data includes:

increasing the minimum luminance value and decreasing the maximum luminance value, or increasing the minimum luminance value, or decreasing the maximum luminance value.

Preferably, the step of level-stretching luminance of the dynamic video image according to the first histogram and the main distribution range includes:

based on the first histogram and the main distribution range, acquiring a first function relationship between a stretching coefficient r and a first difference $\Delta Y$, a second function relationship between a first degree of deviation $r_1$ and a second difference $\Delta y1$ of a first tensile curve y1 and a third function relationship between a second degree of deviation $r_2$ and a third difference $\Delta y2$ of a second tensile curve y2, wherein the first difference $\Delta Y$ is a difference of the maximum luminance and the minimum luminance in the main distribution range, the second difference $\Delta y1$ is a difference between luminance on the first tensile curve y1 and the minimum luminance in the first histogram, and the third difference $\Delta y2$ is a difference between the maximum luminance in the first histogram and luminance on the second tensile curve y2;

calculating the first tensile curve y1 based on the first function relationship and the second function relationship, and calculating the second tensile curve y2 based on the first function relationship and the third function relationship; and calculating a tensile curve y based on the first tensile curve y1 and the second tensile curve y2, and level-stretching the luminance of the dynamic video image according to the tensile curve y.

Preferably, the step of level-stretching luminance of the dynamic video image according to the first histogram and the main distribution range further includes:

synchronously adjusting a blue chrominance component Cb and a red chrominance component Cr.

In addition, to achieve the foregoing objective, the present invention further provides an image processing apparatus, wherein the apparatus includes:

an acquisition module, used for acquiring luminance data of pixel points of a dynamic video image; and a drawing module, used for performing separate statistical processing on frequencies of first luminance data with the minimum luminance value and second luminance data with the maximum luminance value in the luminance data, to draw a first histogram corresponding to the luminance data after the statistical processing.

Preferably, the drawing module includes:

an expansion unit, used for expanding a luminance range of the luminance data;

a first statistical unit, used for performing separate statistical processing on the frequencies of the first luminance data and the second luminance data, and performing frequency statistics processing on other luminance data expect the first luminance data and the second luminance data according to a preset condition;

a first drawing unit, used for drawing a second histogram corresponding to the luminance data after the frequency statistics processing; and a removal unit, used for removing first luminance data in the first statistical bar in the second histogram, and removing second luminance data in the last statistical bar, to obtain the first histogram.

Preferably, the drawing module includes:

a narrowing unit, used for narrowing a luminance range of the luminance data;

a second statistical unit, used for performing separate statistical processing on the frequencies of the first luminance data and the second luminance data, and performing frequency statistics processing on the luminance data after narrowing according to a preset condition; and a second drawing unit, used for drawing a first histogram corresponding to the luminance data after the frequency statistics processing.

In addition, to achieve the foregoing objective, the present invention further provides an image processing apparatus, wherein the apparatus includes:

a first acquisition module, used for acquiring luminance data of pixel points of a dynamic video image;

a drawing module, used for performing separate statistical processing on frequencies of first luminance data with the minimum luminance value and second luminance data with the maximum luminance value in the luminance data, to draw a first histogram corresponding to the luminance data after the statistical processing;

a second acquisition module, used for acquiring a main distribution range of luminance according to the first histogram; and a stretching module, used for level-stretching luminance of the dynamic video image according to the first histogram and the main distribution range.

Preferably, the drawing module includes:

an expansion unit, used for expanding a luminance range of the luminance data;

a first statistical unit, used for performing separate statistical processing on the frequencies of the first luminance data and the second luminance data, and performing frequency statistics processing on other luminance data expect the first luminance data and the second luminance data according to a preset condition;

a first drawing unit, used for drawing a second histogram corresponding to the luminance data after the frequency statistics processing; and a removal unit, used for removing first luminance data in the first statistical bar in the second histogram, and removing second luminance data in the last statistical bar, to obtain the first histogram.

Preferably, the drawing module includes:

a narrowing unit, used for narrowing a luminance range of the luminance data;

a second statistical unit, used for performing separate statistical processing on the frequencies of the first luminance data and the second luminance data, and performing frequency statistics processing on the luminance data after narrowing according to a preset condition; and a second drawing unit, used for drawing a first histogram corresponding to the luminance data after the frequency statistics processing.

Preferably, the stretching module includes:

an acquisition unit, used for, based on the first histogram and the main distribution range, acquiring a first function relationship between a stretching coefficient r and a first difference $\Delta Y$, a second function relationship between a first degree of deviation $r_1$ and a second difference $\Delta y1$ of a first tensile curve y1 and a third function relationship between a second degree of deviation $r_2$ and a third difference $\Delta y2$ of a second tensile curve y2, wherein the first difference $\Delta Y$ is a difference of the maximum luminance and the minimum luminance in the main distribution range, the second difference $\Delta y1$ is a difference between luminance on the first tensile curve y1 and the minimum luminance in the first histogram, and the third difference $\Delta y2$ is a difference between the maximum luminance in the first histogram and luminance on the second tensile curve y2;

a calculation unit, used for calculating the first tensile curve y1 based on the first function relationship and the second function relationship, and calculating the second tensile curve y2 based on the first function relationship and the third function relationship; and a stretching unit, used for calculating a tensile curve y based on the first tensile curve y1 and the second tensile curve y2, and level-stretching the luminance of the dynamic video image according to the tensile curve y.

Preferably, the stretching module further includes:

a synchronization unit, used for synchronously adjusting a blue chrominance component Cb and a red chrominance component Cr.

With the method for acquiring a histogram, the method for dynamically adjusting luminance and the image processing apparatuses of the present invention, according to characteristics of first luminance data with the minimum luminance value and second luminance data with the maximum luminance value, the two kinds of luminance data are specifically used as a statistical bar for statistics, and a histogram is drawn. When a new histogram is used for processing image quality, image features can be understood more accurately and more comprehensively from the new histogram, for example, light and shade degrees of an image, distribution situations of luminance of pixels and the like are understood through luminance changes, and the image can be stretched in luminance levels accordingly.

The objective implementation, functional characteristics and advantages of the present invention are further described with reference to the accompanying drawings in combination with embodiments.

DETAILED DESCRIPTION

It should be understood that the specific embodiments described herein are merely used to explain the present invention, but are not used to limit the present invention.

Figure 1:
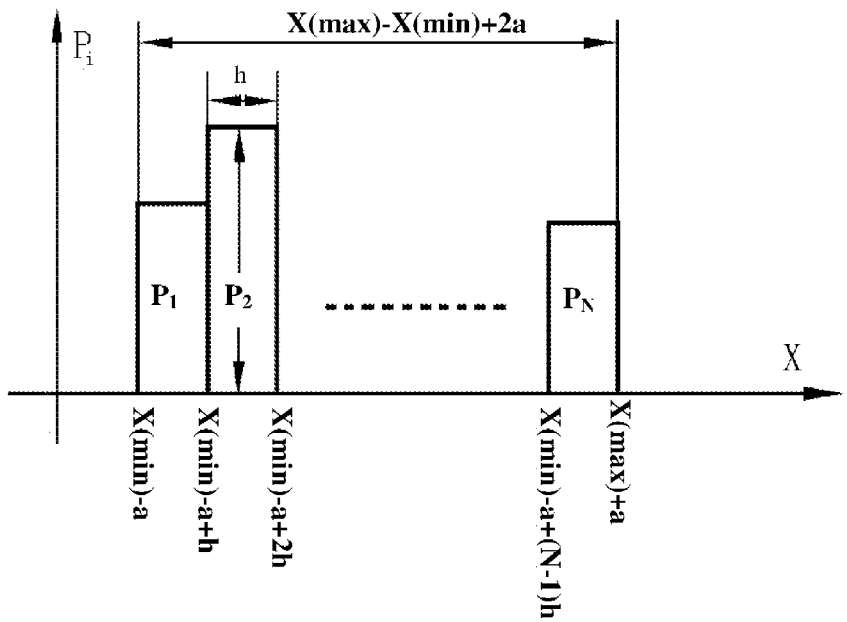
FIG. 1 is an example diagram of a histogram in the prior art.
Figure 2:
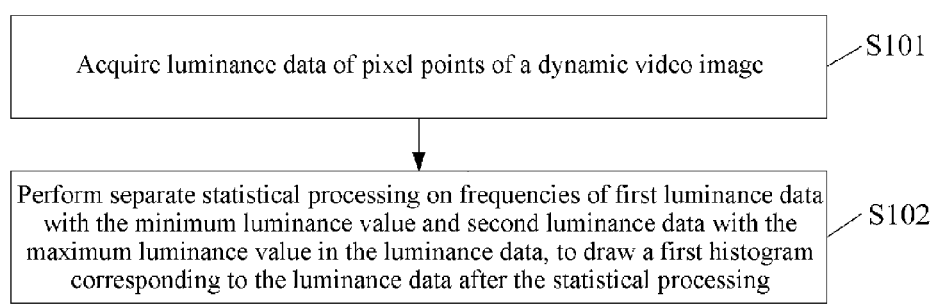
FIG. 2 is a schematic flow chart of one embodiment of a method for acquiring a histogram according to the present invention.

The present invention provides a method for acquiring a histogram, and referring to FIG. 2, in one embodiment, the method for acquiring a histogram includes:

Step S101. Acquire luminance data of pixel points of a dynamic video image.

The method for acquiring a histogram of this embodiment is applied to an image processing apparatus, the apparatus is disposed in a terminal, and the terminal may be a device having video playback and image processing functions such as computers, smart TVs or smartphones.

In this embodiment, when video or continuous images are played on the terminal, luminance data of pixel points of a dynamic video image, that is, luminance of each pixel point, is acquired.

This embodiment is not limited to making statistics on the luminance data, but also may make statistics on other data of the dynamic video image.

Step S102. Perform separate statistical processing on frequencies of first luminance data with the minimum luminance value and second luminance data with the maximum luminance value in the luminance data, to draw a first histogram corresponding to the luminance data after the statistical processing.

In this embodiment, when video or continuous images are played on the terminal, if a user has higher requirements for the dynamic image, the existing histogram cannot reflect image features more accurately and more comprehensively when processing the image quality. In this embodiment, when the existing histogram is used to make statistics on luminance data of the dynamic image, usually, the place with the minimum luminance value is embodied as a black edge of the dynamic image, while the place with the maximum luminance value is embodied as a white edge of the dynamic image, the viewing effect is not ideal, and at the same time, it is also easy to misjudge average pixel luminance of the dynamic image.

This embodiment performs separate statistical processing on frequencies of first luminance data with the minimum luminance value and second luminance data with the maximum luminance value, and the histogram drawn can overcome the aforementioned shortcomings This embodiment performs separate statistical processing on frequencies of first luminance data with the minimum luminance value and second luminance data with the maximum luminance value in the following two manners: the manner of expanding a luminance range and the manner of narrowing a luminance range. For the manner of expanding a luminance range, as the expanded part actually has a pixel point of 0, the histogram drawn is compatible with the existing histogram; and for the manner of narrowing a luminance range, the histogram drawn is not compatible with the existing histogram.

This embodiment, according to characteristics of first luminance data with the minimum luminance value and second luminance data with the maximum luminance value, specifically uses the two kinds of luminance data as a statistical bar for statistics, and draws a histogram. When a new histogram is used for processing image quality, image features can be understood more accurately and more comprehensively from the new histogram, for example, light and shade degrees of an image, distribution situations of luminance of pixels and the like are understood through luminance changes, and the image can be stretched in luminance levels accordingly.

Figure 3:
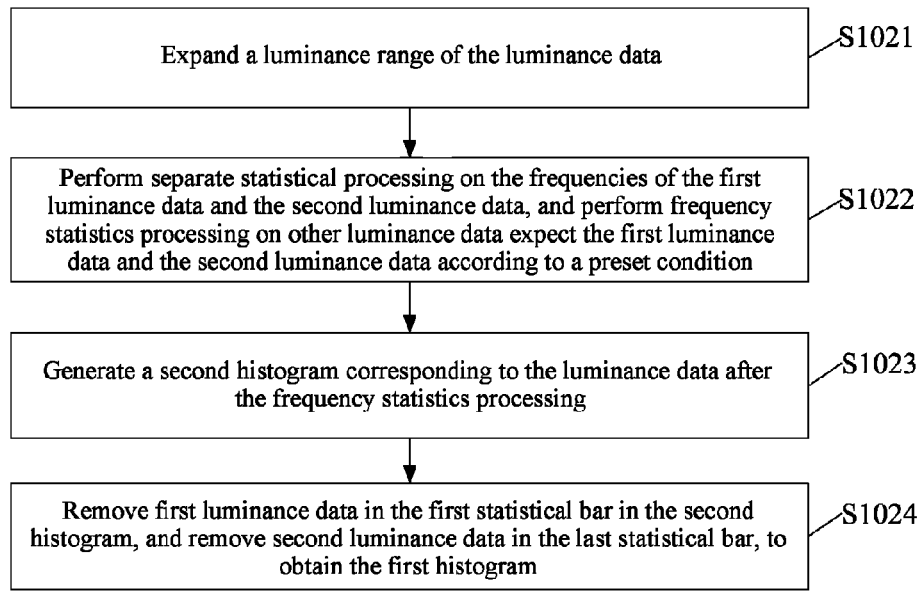
FIG. 3 is a detailed schematic flow chart of one embodiment of step S102 in FIG. 2.
Figure 4:
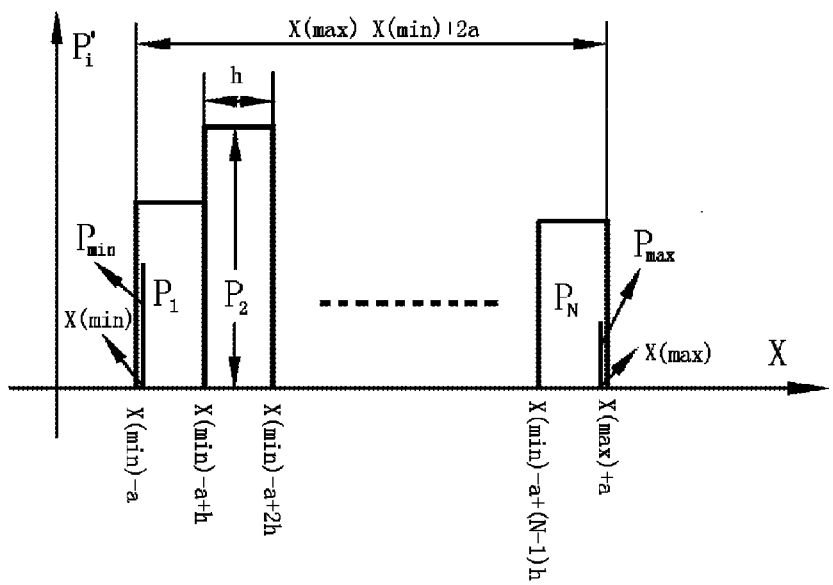
FIG. 4 is an example diagram of the histogram drawn in FIG. 3.

In one preferred embodiment, as shown in FIG. 3 and FIG. 4, on the basis of the embodiment of FIG. 2, step S102 includes:

step S1021, expanding a luminance range of the luminance data;

step S1022, performing separate statistical processing on the frequencies of the first luminance data and the second luminance data, and performing frequency statistics processing on other luminance data expect the first luminance data and the second luminance data according to a preset condition;

step S1023, drawing a second histogram corresponding to the luminance data after the frequency statistics processing; and step S1024, removing first luminance data in the first statistical bar in the second histogram, and removing second luminance data in the last statistical bar, to obtain the first histogram.

In this embodiment, as the expanded part actually has a pixel point of 0, the first statistical bar P1 in FIG. 4 and the existing statistical bar have the same statistical frequency result, and the same is true of the final statistical bar PN; therefore, the histogram drawn is compatible with the existing histogram.

However, as this embodiment has made separate statistics on frequencies of the first luminance data and the second luminance data, statistics on the first luminance data has been repeated in the first statistical bar P1, and statistics on the second luminance data has been repeated in the final statistical bar PN; therefore, it is necessary to remove the luminance data on which statistics has been repeated in P1 and PN.

In this embodiment, the manner of expanding a luminance range is not limited to the manner of decreasing the minimum luminance and increasing the maximum luminance as shown in FIG. 4, and the manner of only decreasing the minimum luminance or only increasing the maximum luminance is also feasible.

Figure 5:
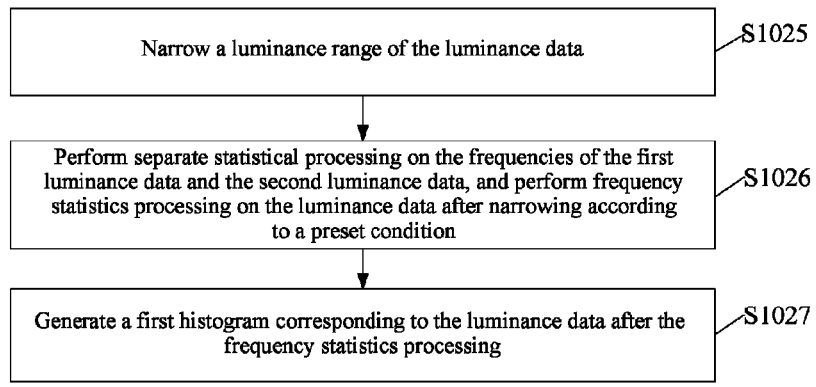
FIG. 5 is a detailed schematic flow chart of another embodiment of step S102 in FIG. 2.
Figure 6:
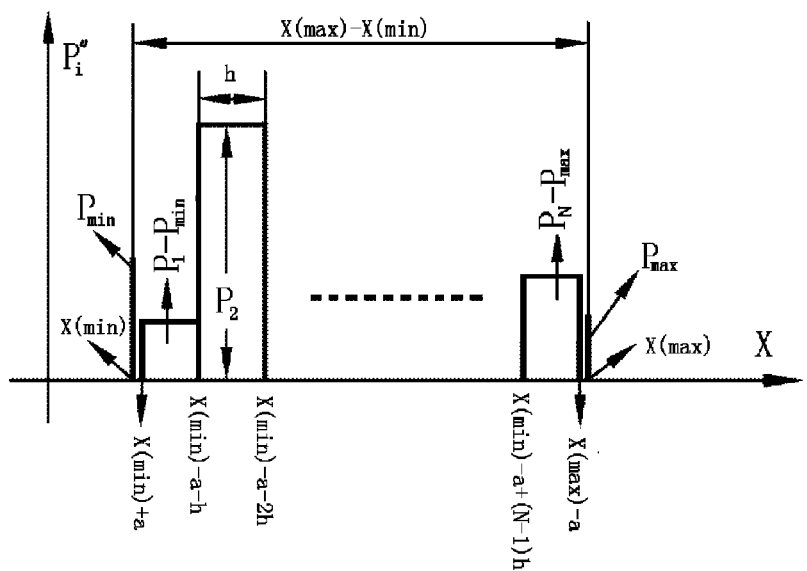
FIG. 6 is an example diagram of the histogram drawn in FIG. 5.

In another preferred embodiment, as shown in FIG. 5 and FIG. 6, on the basis of the embodiment of FIG. 2, step S102 may further include:

step S1025, narrowing a luminance range of the luminance data;

step S1026, performing separate statistical processing on the frequencies of the first luminance data and the second luminance data, and performing frequency statistics processing on the luminance data after narrowing according to a preset condition; and step S1027, drawing a first histogram corresponding to the luminance data after the frequency statistics processing.

In this embodiment, as shown in FIG. 6, the pixel point of the narrowed part is not 0, that is, X(min)+a is slightly greater than X(min), therefore, the first statistical bar in FIG. 6 and the existing statistical bar do not have the same statistical frequency result, which is (P1−Pmin), and the same is true of the final statistical bar, which is (PN−Pmax); therefore, the histogram drawn is not compatible with the existing histogram.

As this embodiment has made separate statistics on frequencies of the first luminance data and the second luminance data, in FIG. 6, statistics on the first luminance data is not repeated in the first statistical bar (P1−Pmin), and statistics on the second luminance data is not repeated in the final statistical bar (PN−Pmax) either; therefore, each statistical bar can be obtained directly in this manner, which does not require the later removal processing as the expanding a luminance range and does not require additional calculation.

In this embodiment, the manner of narrowing a luminance range is not limited to the manner of increasing the minimum luminance value and decreasing the maximum luminance value as shown in FIG. 6, and the manner of only increasing the minimum luminance value or only decreasing the maximum luminance value is also feasible.

Figure 7:
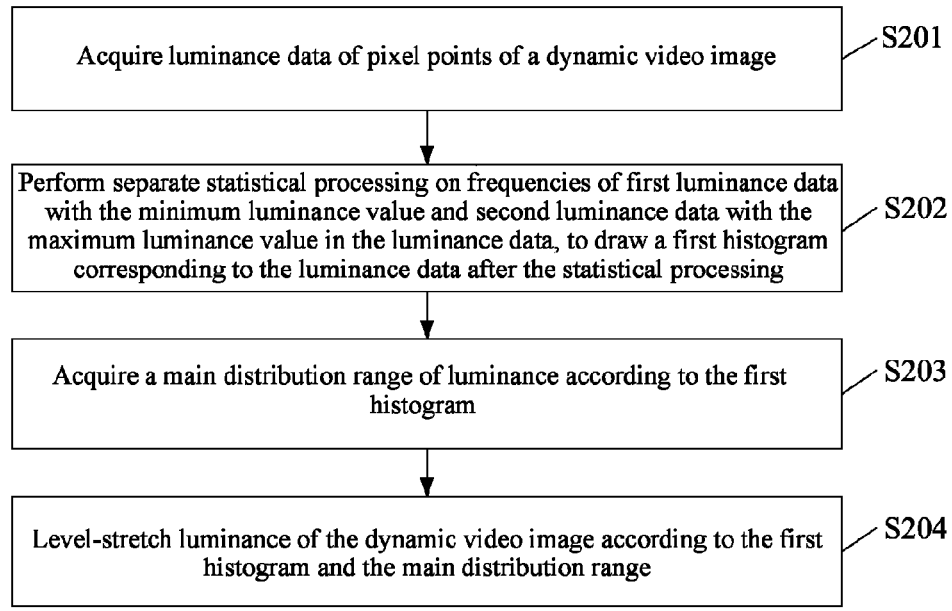
FIG. 7 is a schematic flow chart of one embodiment of a method for dynamically adjusting luminance according to the present invention.

The present invention further provides a method for dynamically adjusting luminance, and as shown in FIG. 7, in one embodiment, the method for dynamically adjusting luminance includes the following steps:

Step S201. Acquire luminance data of pixel points of a dynamic video image.

The method for dynamically adjusting luminance of this embodiment is applied to an image processing apparatus, the apparatus is disposed in a terminal, and the terminal may be a device having video playback and image processing functions such as computers, smart TVs or smartphones.

In this embodiment, when video or continuous images are played on the terminal, luminance data of pixel points of a dynamic video image, that is, luminance of each pixel point, is acquired.

This embodiment is not limited to making statistics on the luminance data, but also may make statistics on other data of the dynamic video image.

Step S202. Perform separate statistical processing on frequencies of first luminance data with the minimum luminance value and second luminance data with the maximum luminance value in the luminance data, to draw a first histogram corresponding to the luminance data after the statistical processing.

In this embodiment, when video or continuous images are played on the terminal, if a user has higher requirements for the dynamic image, the existing histogram cannot reflect image features more accurately and more comprehensively when processing the image quality. In this embodiment, when the existing histogram is used to make statistics on luminance data of the dynamic image, usually, the place with the minimum luminance value is embodied as a black edge of the dynamic image, while the place with the maximum luminance value is embodied as a white edge of the dynamic image, the viewing effect is not ideal, and at the same time, it is also easy to misjudge average pixel luminance of the dynamic image.

This embodiment performs separate statistical processing on frequencies of first luminance data with the minimum luminance value and second luminance data with the maximum luminance value, and the histogram drawn can overcome the aforementioned shortcomings This embodiment performs separate statistical processing on frequencies of first luminance data with the minimum luminance value and second luminance data with the maximum luminance value in the following two manners: the manner of expanding a luminance range and the manner of narrowing a luminance range. For the manner of expanding a luminance range, as the expanded part actually has a pixel point of 0, the histogram drawn is compatible with the existing histogram; and for the manner of narrowing a luminance range, the histogram drawn is not compatible with the existing histogram.

This embodiment, according to characteristics of first luminance data with the minimum luminance value and second luminance data with the maximum luminance value, specifically uses the two kinds of luminance data as a statistical bar for statistics, and draws a histogram. When a new histogram is used for processing image quality, image features can be understood more accurately and more comprehensively from the new histogram, for example, light and shade degrees of an image, distribution situations of luminance of pixels and the like are understood through luminance changes, and the image can be stretched in luminance levels accordingly.

Step S203. Acquire a main distribution range of luminance according to the first histogram.

In this embodiment, luminance values of first luminance data Y(min), second luminance data Y(max) and pixel points nearby are eliminated, and a main distribution range of luminance can be analyzed using the first histogram. It is set that the luminance is mainly distributed on jth to kth statistical bars, and it is easy to know that j and k should satisfy the following condition: $1 \leq j \leq k \leq N$.

By taking the first histogram as an example, M is the total number of pixels, P' is the frequency, the eliminated first luminance data and the number u of pixel points nearby, the eliminated second luminance data and the number v of pixel points nearby are introduced, and j and k need to satisfy the following conditions:

1) when $j = 1$, $P'_1 > u$, 2) when $j > 1$, $\sum_{i}^{j} P'_i > u$ and $\sum^{j-1} P'_i \leq u$, 3) when $k = N$, $P'_N > v$, 4) when $k < N$, $\sum^{N} P'_i > v$ and $\sum^{N} P'_i \leq v$, the minimum value Y1 of the luminance is a lower limiting value of the jth statistical bar, and the maximum value Y2 is an upper limiting value of the kth statistical bar, therefore:

$Y1=Y(\min)+a$ when $j=1$, $Y1=Y(\min)-a+(j-1)h$ when $j\geq 1$, $Y2=Y(\max)-a$ when $k=N$, $Y2=Y(\min)-a+kh$ when $k<N$, thus, the main distribution range of the luminance is determined as:

Y1<Y<Y2.

Step 204. Level-stretch luminance of the dynamic video image according to the first histogram and the main distribution range.

In this embodiment, the stretched y can be obtained according to the first histogram and the main distribution range, for example, for an 8 bits video YCbCr signal image, a value range of the luminance is set as 16 to 235, that is:

$$\begin{cases} Y_{min} = 16 \\ Y_{max} = 235 \end{cases},$$

it is set that a main distribution range of luminance of all pixel points of a certain image is from Y1 to Y2, and satisfies:

$16 \leq Y1 \leq Y \leq Y2 \leq 235$, at this point, it is feasible to stretch levels of the luminance according to Y(min) and Y(max) through the equation:

$$y=f(Y)=k \times Y+b,$$

it is set that Y is stretched within a range of [y1, y2], and y1 and y2 satisfy:

$$16 \leq y1 \leq Y1 \leq Y2 \leq y2 \leq 235,$$

and, according to the equation $y=f(Y)=k \times Y+b$, $$\begin{cases} y1 = k \times Y1 + b \\ y2 = k \times Y2 + b \end{cases} \text{ is obtained,}$$

by solving solve a system of equations, there is:

$$\begin{cases} k = (y2 - y1)/(Y2 - Y1) \\ b = (y1 \times Y2 - y2 \times Y1)/(Y2 - Y1) \end{cases},$$

and it is easy to know from the equation $y=f(Y)=k \times Y+b$ that:

$$k=(y2-y1)/(Y2-Y1) \geq 1.$$

In one specific implementation process, if the image has pixel points of which Y are 16 and 235, at this point, if statistics is made according to the existing histogram, there is:

$$\begin{cases} y1 = Y1 = 16 \\ y2 = Y2 = 235 \end{cases}, \text{ and } k = 1,$$

that is, it is insufficient to perform stretching processing according to the condition now.

In another specific implementation process, according to the histogram of this embodiment, it is feasible to first eliminate pixel points whose luminance is 16 and 235 and make:

$$\begin{cases} 16 \leq y1 < Y1 = Y3 \\ 235 \leq y2 > Y2 = Y4 \end{cases}, \text{ and } k > 1,$$

that is, at this point, it is feasible to, through $y=f(Y)=k \times Y+b$, make the value range of the luminance expanded, that is, stretched, respective levels thereof are also stretched, and such processing will not sacrifice image levels and details.

In one preferred embodiment, in combination with FIG. 4, on the basis of the embodiment of FIG. 7, step S202 includes:

S2021, expanding a luminance range of the luminance data;

S2022, performing separate statistical processing on the frequencies of the first luminance data and the second luminance data, and performing frequency statistics processing on other luminance data expect the first luminance data and the second luminance data according to a preset condition;

S2023, drawing a second histogram corresponding to the luminance data after the frequency statistics processing; and

S2024, removing first luminance data in the first statistical bar in the second histogram, and removing second luminance data in the last statistical bar, to obtain the first histogram.

In this embodiment, as the expanded part actually has a pixel point of 0, the first statistical bar P1 in FIG. 4 and the existing statistical bar have the same statistical frequency result, and the same is true of the final statistical bar PN; therefore, the histogram drawn is compatible with the existing histogram.

However, as this embodiment has made separate statistics on frequencies of the first luminance data and the second luminance data, statistics on the first luminance data has been repeated in the first statistical bar P1, and statistics on the second luminance data has been repeated in the final statistical bar PN; therefore, it is necessary to remove the luminance data on which statistics has been repeated in P1 and PN.

In this embodiment, the manner of expanding a luminance range is not limited to the manner of decreasing the minimum luminance and increasing the maximum luminance as shown in FIG. 4, and the manner of only decreasing the minimum luminance or only increasing the maximum luminance is also feasible.

In another preferred embodiment, in combination with FIG. 6, on the basis of the embodiment of FIG. 7, step S202 may further include:

step S2025, narrowing a luminance range of the luminance data;

step S2026, performing separate statistical processing on the frequencies of the first luminance data and the second luminance data, and performing frequency statistics processing on the luminance data after narrowing according to a preset condition; and step S2027, drawing a first histogram corresponding to the luminance data after the frequency statistics processing.

In this embodiment, as shown in FIG. 6, the pixel point of the narrowed part is not 0, that is, X(min)+a is slightly greater than X(min), therefore, the first statistical bar in FIG. 6 and the existing statistical bar do not have the same statistical frequency result, which is (P1−Pmin), and the same is true of the final statistical bar, which is (PN−Pmax); therefore, the histogram drawn is not compatible with the existing histogram.

As this embodiment has made separate statistics on frequencies of the first luminance data and the second luminance data, in FIG. 6, statistics on the first luminance data is not repeated in the first statistical bar (P1−Pmin), and statistics on the second luminance data is not repeated in the final statistical bar (PN−Pmax) either; therefore, each statistical bar can be obtained directly in this manner, which does not require the later removal processing as the expanding a luminance range and does not require additional calculation.

In this embodiment, the manner of narrowing a luminance range is not limited to the manner of increasing the minimum luminance value and decreasing the maximum luminance value as shown in FIG. 6, and the manner of only increasing the minimum luminance value or only decreasing the maximum luminance value is also feasible.

Figure 8:
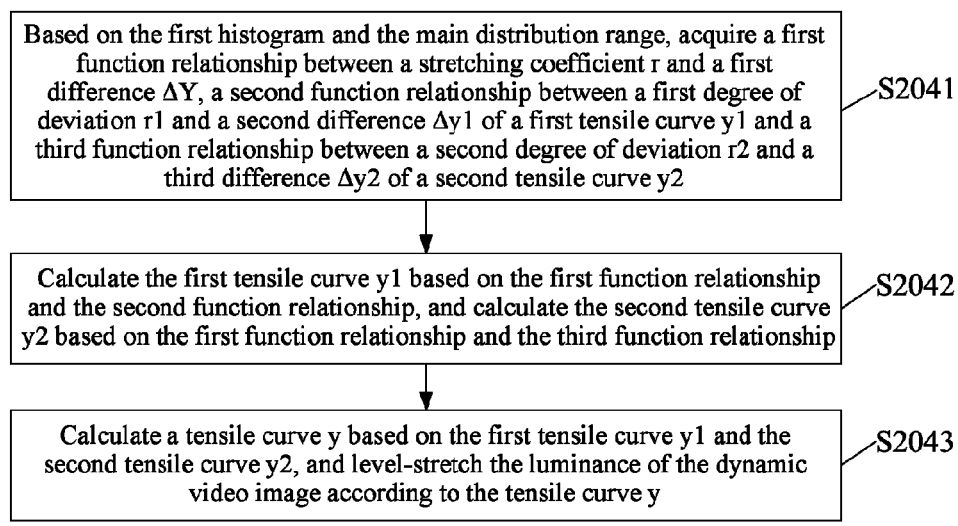
FIG. 8 is a detailed schematic flow chart of step S204 in FIG. 7.

In another preferred embodiment, as shown in FIG. 8, on the basis of the embodiment of FIG. 7, step S204 includes:

step S2041, based on the first histogram and the main distribution range, acquiring a first function relationship between a stretching coefficient r and a first difference $\Delta Y$, a second function relationship between a first degree of deviation r1 and a second difference $\Delta y1$ of a first tensile curve y1 and a third function relationship between a second degree of deviation r2 and a third difference $\Delta y2$ of a second tensile curve y2;

step S2042, calculating the first tensile curve y1 based on the first function relationship and the second function relationship, and calculating the second tensile curve y2 based on the first function relationship and the third function relationship; and step S2043, calculating a tensile curve y based on the first tensile curve y1 and the second tensile curve y2, and level-stretching the luminance of the dynamic video image according to the tensile curve y.

The first difference ΔY is a difference of the maximum luminance and the minimum luminance in the main distribution range, the second difference Δy1 is a difference between luminance on the first tensile curve y1 and the minimum luminance in the first histogram, and the third difference Δy2 is a difference between the maximum luminance in the first histogram and luminance on the second tensile curve y2.

Figure 9:
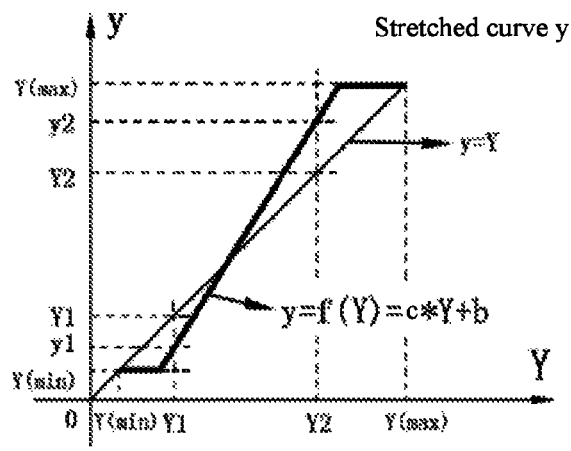
FIG. 9 is an example diagram of the luminance before stretching and after stretching in FIG. 8.

As shown in FIG. 9, the first tensile curve y1 and the second tensile curve y2 form the stretched curve y in this embodiment.

The tensile coefficient r is: $r = \Delta Y/\Delta Y_m$;
wherein $\Delta Y = Y2-Y1$, and $\Delta Y_m = Y(\max)-Y(\min)$.

The tensile coefficient r reflects the concentration degree of main distribution data, the greater the tensile coefficient r is, the greater the main distribution range is, and stretching can be performed; the smaller the tensile coefficient r is, the smaller r the main distribution range is, and stretching is limited or not performed.

Figure 10:
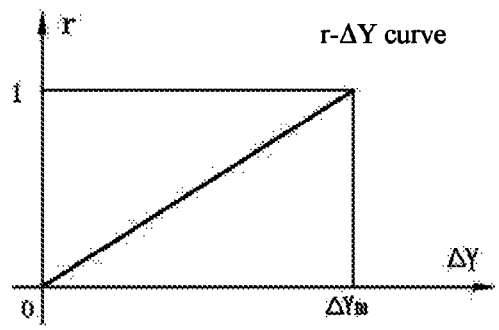
FIG. 10 is an example diagram of the r-$\Delta Y$ curve in FIG. 8.

As shown in FIG. 10, the first function relationship is a r–ΔY curve, obviously, 0<r<1, and r increases with increase of ΔY.

The first degree of deviation r1 is the degree to which the first tensile curve y1 deviates from Y(min), and the second degree of deviation r2 is the degree to which the second tensile curve y2 deviates from Y(max).

Figure 11:
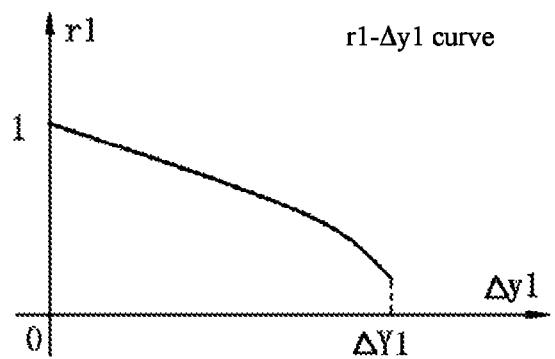
FIG. 11 is an example diagram of the r1-$\Delta y1$ curve in FIG. 8.

The first degree of deviation r1 is:

$$r_1 = \frac{\Delta y_1}{\Delta Y_1 \times r},$$

wherein $\Delta y_1 = y1-Y(\min)$, $\Delta Y_1 = Y1-Y(\min)$, and herein $0 \le r_1 < 1$, which needs to decrease with increase of $\Delta y_1$, as shown in FIG. 11. Certainly, the second function relationship $r_1-\Delta y_1$ curve may be set as the optimal according to adjustment effects of various actual scenes during adjustment of image quality.

In combination with the tensile coefficient r and the first degree of deviation r1, $$y_1 = r \times r_1 \times \Delta Y_1 \times Y(\min) = \frac{Y2-Y1}{Y(\max)-Y(\min)} \times r_1 \times [Y1-Y(\min)] + Y(\min)$$

can be obtained,
wherein Y(max) and Y(min) are constants, values of Y2 and Y1 are decided by a current video dynamic image, and the value of r1 can be found out according to the $r_1-\Delta y_1$ curve in FIG. 11.

Figure 12:
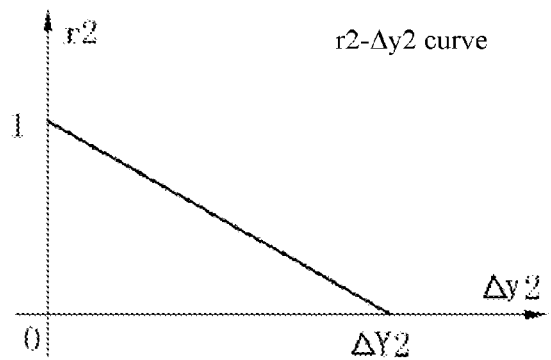
FIG. 12 is an example diagram of the r2-$\Delta y2$ curve in FIG. 8.

The first degree of deviation r2 is:

$$r_2 = \frac{\Delta y_2}{\Delta Y_2 \times r},$$

wherein $\Delta y_2 = Y(\max)-y2$, $\Delta Y_2 = Y(\max)-Y2$, and herein $0 < r_2 < 1$, which decreases with increase of $\Delta y_2$, as shown in FIG. 12. Certainly, the third function relationship $r_2-\Delta y_2$ curve may be set as the optimal according to adjustment effects of various actual scenes during adjustment of image quality.

In combination with the tensile coefficient r and the first degree of deviation r2, $$y_2 = Y(\max) - r \times r_2 \times \Delta Y_2 = Y(\max) - \frac{Y2-Y1}{Y(\max)-Y(\min)} \times r_2 \times [Y(\max)-Y2]$$

can be obtained,
wherein Y(max) and Y(min) are constants, values of Y2 and Y1 are decided by a current video dynamic image, and the value of r2 can be found out according to the $r_2-\Delta y_2$ curve in FIG. 12.

As shown in FIG. 9, the luminance is level-stretched through $y=f(Y)=c \times Y+b$, stretching is performed within a range of [y1, y2], and y1 and y2 satisfy: $Y(\min) \le y1 < Y1 \le Y \le Y2 < y2 \le Y(\max)$,
there is $$\begin{cases} y1 = c \times Y1 + b \\ y2 = c \times Y2 + b \end{cases},$$

and in combination with y1 and y2 and by solving a system of equations, there is:

$$\begin{cases} c = (y2-y1)/(Y2-Y1) \\ b = (y1 \times Y2 - y2 \times Y1)/(Y2-Y1) \end{cases},$$

that is, an equation of stretching [Y1, Y2] to [y1, y2] is:

$$y = \frac{y2-y1}{Y2-Y1} \times Y + \frac{y1 \times Y2 - y2 \times Y1}{Y2-Y1}.$$

For the dynamic video image, the main distribution range [Y1, Y2] of the luminance is constantly changing, y1 and y2 adapting thereto can be obtained in real time, and values of c and b are obtained finally, thereby dynamically adjusting intercept b and gain c of the luminance, to achieve level stretching of the luminance, which improves light and dark levels and depth of field effects of the image and achieves adaptive dynamic luminance adjustment, and at the same time, according to the luminance adjustment, contrast may also be properly adjusted.

In one preferred embodiment, on the basis of the embodiment of FIG. 8, the method for dynamically adjusting luminance further includes the following step: synchronously adjusting a blue chrominance component Cb and a red chrominance component Cr.

In combination with FIG. 9, level stretching of Y is achieved through the equation $$y = \frac{y2-y1}{Y2-Y1} \times Y + \frac{y1 \times Y2 - y2 \times Y1}{Y2-Y1},$$

and although levels of the luminance within the main distribution range [Y1, Y2] is stretched, at this point, saturation obviously occurs in the luminance in intervals [Y(min), Y1] and [Y2, Y(max)], that is, cut-off occurs, which indicates that level stretching of Y in an interval [Y1, Y2] is established on the basis of sacrificing luminance levels of the intervals [Y(min), Y1] and [Y2, Y(max)].

As separate level stretching for the luminance will change the size of saturation of the pixel points, at this point, it is necessary to synchronously adjust a blue chrominance component Cb and a red chrominance component Cr of the dynamic image.

In this embodiment, when cut-off occurs in the intervals [Y(min), Y1] and [Y2, Y(max)], it is necessary to make $$\begin{cases} Y' = Y(\min) \\ Cb' = 0 \\ Cr' = 0 \end{cases} \text{ or } \begin{cases} Y' = Y(\max) \\ Cb' = 0 \\ Cr' = 0 \end{cases},$$

wherein Y' is the luminance after Cb and Cr are synchronously adjusted;
when cut-off does not occur, $$k = \frac{c \times Y + b}{Y} = \frac{y2 - y1}{Y2 - Y1} + \frac{y1 \times Y2 - y2 \times Y1}{Y(Y2 - Y1)}$$

is set, and there is:

$$\begin{cases} Y' = c \times Y + b = k \times Y \\ Cb' = k \times Cb \\ Cr' = k \times Cr \end{cases}.$$

So far, synchronous adjustment of Cb, Cr and the luminance has been achieved, to make saturation of respective pixel points of the dynamic image unchanged before and after adjustment.

Figure 13:
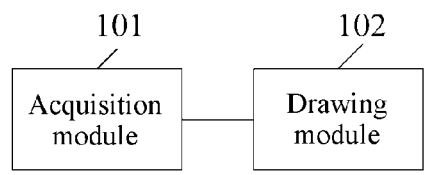
FIG. 13 is a schematic diagram of functional modules of one embodiment of an image processing apparatus according to the present invention.

The present invention further provides an image processing apparatus, as shown in FIG. 13, the apparatus including:

An acquisition module 101, used for acquiring luminance data of pixel points of a dynamic video image.

The image processing apparatus of this embodiment is disposed in a terminal, and the terminal may be a device having video playback and image processing functions such as computers, smart TVs or smartphones.

In this embodiment, when video or continuous images are played on the terminal, luminance data of pixel points of a dynamic video image, that is, luminance of each pixel point, is acquired.

This embodiment is not limited to making statistics on the luminance data, but also may make statistics on other data of the dynamic video image.

A drawing module 102, used for performing separate statistical processing on frequencies of first luminance data with the minimum luminance value and second luminance data with the maximum luminance value in the luminance data, to draw a first histogram corresponding to the luminance data after the statistical processing.

In this embodiment, when video or continuous images are played on the terminal, if a user has higher requirements for the dynamic image, the existing histogram cannot reflect image features more accurately and more comprehensively when processing the image quality. In this embodiment, when the existing histogram is used to make statistics on luminance data of the dynamic image, usually, the place with the minimum luminance value is embodied as a black edge of the dynamic image, while the place with the maximum luminance value is embodied as a white edge of the dynamic image, the viewing effect is not ideal, and at the same time, it is also easy to misjudge average pixel luminance of the dynamic image.

This embodiment performs separate statistical processing on frequencies of first luminance data with the minimum luminance value and second luminance data with the maximum luminance value, and the histogram drawn can overcome the aforementioned shortcomings This embodiment performs separate statistical processing on frequencies of first luminance data with the minimum luminance value and second luminance data with the maximum luminance value in the following two manners: the manner of expanding a luminance range and the manner of narrowing a luminance range. For the manner of expanding a luminance range, as the expanded part actually has a pixel point of 0, the histogram drawn is compatible with the existing histogram; and for the manner of narrowing a luminance range, the histogram drawn is not compatible with the existing histogram.

This embodiment, according to characteristics of first luminance data with the minimum luminance value and second luminance data with the maximum luminance value, specifically uses the two kinds of luminance data as a statistical bar for statistics, and draws a histogram. When a new histogram is used for processing image quality, image features can be understood more accurately and more comprehensively from the new histogram, for example, light and shade degrees of an image, distribution situations of luminance of pixels and the like are understood through luminance changes, and the image can be stretched in luminance levels accordingly.

In one preferred embodiment, on the basis of FIG. 13, the drawing module 102 includes:

an expansion unit, used for expanding a luminance range of the luminance data;

a first statistical unit, used for performing separate statistical processing on the frequencies of the first luminance data and the second luminance data, and performing frequency statistics processing on other luminance data expect the first luminance data and the second luminance data according to a preset condition;

a first drawing unit, used for drawing a second histogram corresponding to the luminance data after the frequency statistics processing; and a removal unit, used for removing first luminance data in the first statistical bar in the second histogram, and removing second luminance data in the last statistical bar, to obtain the first histogram.

In this embodiment, as the expanded part actually has a pixel point of 0, the first statistical bar P1 and the existing statistical bar have the same statistical frequency result, and the same is true of the final statistical bar PN; therefore, the histogram drawn is compatible with the existing histogram.

However, as this embodiment has made separate statistics on frequencies of the first luminance data and the second luminance data, statistics on the first luminance data has been repeated in the first statistical bar P1, and statistics on the second luminance data has been repeated in the final statistical bar PN; therefore, it is necessary to remove the luminance data on which statistics has been repeated in P1 and PN.

In this embodiment, the manner of expanding a luminance range is not limited to the manner of decreasing the minimum luminance and increasing the maximum luminance, and the manner of only decreasing the minimum luminance or only increasing the maximum luminance is also feasible.

In another preferred embodiment, on the basis of FIG. 13, the drawing module 102 may further include:

a narrowing unit, used for narrowing a luminance range of the luminance data;

a second statistical unit, used for performing separate statistical processing on the frequencies of the first luminance data and the second luminance data, and performing frequency statistics processing on the luminance data after narrowing according to a preset condition; and a second drawing unit, used for drawing a first histogram corresponding to the luminance data after the frequency statistics processing.

In this embodiment, the pixel point of the narrowed part is not 0, that is, X(min)+a is slightly greater than X(min), therefore, the first statistical bar and the existing statistical bar do not have the same statistical frequency result, which is (P1−Pmin), and the same is true of the final statistical bar, which is (PN−Pmax); therefore, the histogram drawn is not compatible with the existing histogram.

As this embodiment has made separate statistics on frequencies of the first luminance data and the second luminance data, statistics on the first luminance data is not repeated in the first statistical bar (P1−Pmin), and statistics on the second luminance data is not repeated in the final statistical bar (PN−Pmax) either; therefore, each statistical bar can be obtained directly in this manner, which does not require the later removal processing as the expanding a luminance range and does not require additional calculation.

In this embodiment, the manner of narrowing a luminance range is not limited to the manner of increasing the minimum luminance value and decreasing the maximum luminance value, and the manner of only increasing the minimum luminance value or only decreasing the maximum luminance value is also feasible.

Figure 14:
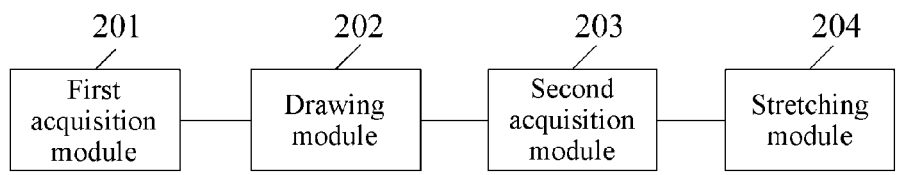
FIG. 14 is a schematic diagram of functional modules of another embodiment of the image processing apparatus according to the present invention.

The present invention further provides an image processing apparatus, as shown in FIG. 14, the apparatus including:

A first acquisition module 201, used for acquiring luminance data of pixel points of a dynamic video image.

The image processing apparatus of this embodiment is disposed in a terminal, and the terminal may be a device having video playback and image processing functions such as computers, smart TVs or smartphones.

In this embodiment, when video or continuous images are played on the terminal, luminance data of pixel points of a dynamic video image, that is, luminance of each pixel point, is acquired.

This embodiment is not limited to making statistics on the luminance data, but also may make statistics on other data of the dynamic video image.

A drawing module 202, used for performing separate statistical processing on frequencies of first luminance data with the minimum luminance value and second luminance data with the maximum luminance value in the luminance data, to draw a first histogram corresponding to the luminance data after the statistical processing.

In this embodiment, when video or continuous images are played on the terminal, if a user has higher requirements for the dynamic image, the existing histogram cannot reflect image features more accurately and more comprehensively when processing the image quality. In this embodiment, when the existing histogram is used to make statistics on luminance data of the dynamic image, usually, the place with the minimum luminance value is embodied as a black edge of the dynamic image, while the place with the maximum luminance value is embodied as a white edge of the dynamic image, the viewing effect is not ideal, and at the same time, it is also easy to misjudge average pixel luminance of the dynamic image.

This embodiment performs separate statistical processing on frequencies of first luminance data with the minimum luminance value and second luminance data with the maximum luminance value, and the histogram drawn can overcome the aforementioned shortcomings.

This embodiment performs separate statistical processing on frequencies of first luminance data with the minimum luminance value and second luminance data with the maximum luminance value in the following two manners: the manner of expanding a luminance range and the manner of narrowing a luminance range. For the manner of expanding a luminance range, as the expanded part actually has a pixel point of 0, the histogram drawn is compatible with the existing histogram; and for the manner of narrowing a luminance range, the histogram drawn is not compatible with the existing histogram.

This embodiment, according to characteristics of first luminance data with the minimum luminance value and second luminance data with the maximum luminance value, specifically uses the two kinds of luminance data as a statistical bar for statistics, and draws a histogram. When a new histogram is used for processing image quality, image features can be understood more accurately and more comprehensively from the new histogram, for example, light and shade degrees of an image, distribution situations of luminance of pixels and the like are understood through luminance changes, and the image can be stretched in luminance levels accordingly.

A second acquisition module 203, used for acquiring a main distribution range of luminance according to the first histogram.

In this embodiment, luminance values of first luminance data Y(min), second luminance data Y(max) and pixel points nearby are eliminated, and a main distribution range of luminance can be analyzed using the first histogram. It is set that the luminance is mainly distributed on jth to kth statistical bars, and it is easy to know that j and k should satisfy the following condition: 1≤j≤k≤N.

By taking the first histogram as an example, M is the total number of pixels, P' is the frequency, the eliminated first luminance data and the number u of pixel points nearby, the eliminated second luminance data and the number v of pixel points nearby are introduced, and j and k need to satisfy the following conditions:

1) when $j = 1$, $P'_1 > u$, 2) when $j > 1$, $\sum^{j} P'_i > u$ and $\sum^{j-1} P'_i \le u$, 3) when $k = N$, $P'_N > v$, 4) when $k < N$, $\sum^{N} P'_i > v$ and $\sum^{N} P'_i \le v$, the minimum value Y1 of the luminance is a lower limiting value of the jth statistical bar, and the maximum value Y2 is an upper limiting value of the kth statistical bar, therefore:

$Y1 = Y(min) + a$ when $j=1$, $Y1 = Y(min) - a + (j-1)h$ when $j>1$, $Y2=Y(\max)-a$ when $k=N$, $Y2=Y(\min)-a+kh$ when $k<N$, thus, the main distribution range of the luminance is determined as:

$Y1<Y<Y2$.

A stretching module 204, used for level-stretching luminance of the dynamic video image according to the first histogram and the main distribution range.

In this embodiment, the stretched y can be obtained according to the first histogram and the main distribution range, for example, for an 8 bits video YCbCr signal image, a value range of the luminance is set as 16 to 235, that is:

$$\begin{cases} Y_{min} = 16 \\ Y_{max} = 235, \end{cases}$$

it is set that a main distribution range of luminance of all pixel points of a certain image is from Y1 to Y2, and satisfies:

$16 \leq Y1 \leq Y \leq Y2 \leq 235$, at this point, it is feasible to stretch levels of the luminance according to Y(min) and Y(max) through the equation:

$y=f(Y)=k \times Y+b$, it is set that Y is stretched within a range of [y1, y2], and y1 and y2 satisfy:

$16 \leq y1 \leq Y1 \leq Y \leq Y2 \leq y2 \leq 235$, and, according to the equation $y=f(Y)=k \times Y+b$, $$\begin{cases} y1 = k \times Y1 + b \\ y2 = k \times Y2 + b \end{cases} \text{ is obtained,}$$

by solving solve a system of equations, there is:

$$\begin{cases} k = (y2-y1)/(Y2-Y1) \\ b = (y1 \times Y2 - y2 \times Y1)/(Y2-Y1) \end{cases},$$

and it is easy to know from the equation $y=f(Y)=k \times Y+b$ that:

$k=(y2-y1)/(Y2-Y1) \geq 1$.

In one specific implementation process, if the image has pixel points of which Y are 16 and 235, at this point, if statistics is made according to the existing histogram, there is:

$$\begin{cases} y1 = Y1 = 16 \\ y2 = Y2 = 235 \end{cases}, \text{ and } k = 1,$$

that is, it is insufficient to perform stretching processing according to the condition now.

In another specific implementation process, according to the histogram of this embodiment, it is feasible to first eliminate pixel points whose luminance is 16 and 235 and make:

$$\begin{cases} 16 \leq y1 < Y1 = Y3 \\ 235 \leq y2 > Y2 = Y4 \end{cases}, \text{ and } k > 1,$$

that is, at this point, it is feasible to, through $y=f(Y)=k \times Y+b$, make the value range of the luminance expanded, that is, stretched, respective levels thereof are also stretched, and such processing will not sacrifice image levels and details.

In one preferred embodiment, on the basis of FIG. 14, the drawing module 202 includes:

an expansion unit, used for expanding a luminance range of the luminance data;

a first statistical unit, used for performing separate statistical processing on the frequencies of the first luminance data and the second luminance data, and performing frequency statistics processing on other luminance data expect the first luminance data and the second luminance data according to a preset condition;

a first drawing unit, used for drawing a second histogram corresponding to the luminance data after the frequency statistics processing; and a removal unit, used for removing first luminance data in the first statistical bar in the second histogram, and removing second luminance data in the last statistical bar, to obtain the first histogram.

In this embodiment, as the expanded part actually has a pixel point of 0, the first statistical bar P1 and the existing statistical bar have the same statistical frequency result, and the same is true of the final statistical bar PN; therefore, the histogram drawn is compatible with the existing histogram.

However, as this embodiment has made separate statistics on frequencies of the first luminance data and the second luminance data, statistics on the first luminance data has been repeated in the first statistical bar P1, and statistics on the second luminance data has been repeated in the final statistical bar PN; therefore, it is necessary to remove the luminance data on which statistics has been repeated in P1 and PN.

In this embodiment, the manner of expanding a luminance range is not limited to the manner of decreasing the minimum luminance and increasing the maximum luminance, and the manner of only decreasing the minimum luminance or only increasing the maximum luminance is also feasible.

In another preferred embodiment, on the basis of FIG. 14, the drawing module 202 may further include:

a narrowing unit, used for narrowing a luminance range of the luminance data;

a second statistical unit, used for performing separate statistical processing on the frequencies of the first luminance data and the second luminance data, and performing frequency statistics processing on the luminance data after narrowing according to a preset condition; and a second drawing unit, used for drawing a first histogram corresponding to the luminance data after the frequency statistics processing.

In this embodiment, the pixel point of the narrowed part is not 0, that is, X(min)+a is slightly greater than X(min), therefore, the first statistical bar and the existing statistical bar do not have the same statistical frequency result, which is (P1−Pmin), and the same is true of the final statistical bar, which is (PN−Pmax); therefore, the histogram drawn is not compatible with the existing histogram.

As this embodiment has made separate statistics on frequencies of the first luminance data and the second luminance data, statistics on the first luminance data is not repeated in the first statistical bar (P1−Pmin), and statistics on the second luminance data is not repeated in the final statistical bar (PN−Pmax) either; therefore, each statistical bar can be obtained directly in this manner, which does not require the later removal processing as the expanding a luminance range and does not require additional calculation.

In this embodiment, the manner of narrowing a luminance range is not limited to the manner of increasing the minimum luminance value and decreasing the maximum luminance value, and the manner of only increasing the minimum luminance value or only decreasing the maximum luminance value is also feasible.

In another preferred embodiment, on the basis of FIG. 14, the stretching module 204 includes:

an acquisition unit, used for, based on the first histogram and the main distribution range, acquiring a first function relationship between a stretching coefficient r and a first difference ΔY, a second function relationship between a first degree of deviation r1 and a second difference Δy1 of a first tensile curve y1 and a third function relationship between a second degree of deviation r2 and a third difference Δy2 of a second tensile curve y2;

a calculation unit, used for calculating the first tensile curve y1 based on the first function relationship and the second function relationship, and calculating the second tensile curve y2 based on the first function relationship and the third function relationship; and a stretching unit, used for calculating a tensile curve y based on the first tensile curve y1 and the second tensile curve y2, and level-stretching the luminance of the dynamic video image according to the tensile curve y.

The first difference ΔY is a difference of the maximum luminance and the minimum luminance in the main distribution range, the second difference Δy1 is a difference between luminance on the first tensile curve y1 and the minimum luminance in the first histogram, and the third difference Δy2 is a difference between the maximum luminance in the first histogram and luminance on the second tensile curve y2.

As shown in FIG. 9, the first tensile curve y1 and the second tensile curve y2 form the stretched curve y in this embodiment.

The tensile coefficient r is: $r = \Delta Y / \Delta Y_m$;
wherein $\Delta Y = Y2 - Y1$, and $\Delta Y_m = Y(max) - Y(min)$.

The tensile coefficient r reflects the concentration degree of main distribution data, the greater the tensile coefficient r is, the greater the main distribution range is, and stretching can be performed; the smaller the tensile coefficient r is, the smaller r the main distribution range is, and stretching is limited or not performed.

As shown in FIG. 10, the first function relationship is a r-ΔY curve, obviously, 0<r<1, and r increases with increase of ΔY.

The first degree of deviation r1 is the degree to which the first tensile curve y1 deviates from Y(min), and the second degree of deviation r2 is the degree to which the second tensile curve y2 deviates from Y(max).

The first degree of deviation r1 is:

$$r_1 = \frac{\Delta y_1}{\Delta Y_1 \times r},$$

wherein $\Delta y_1 = y1 - Y(min)$, $\Delta Y_1 = Y1 - Y(min)$, and herein $0 < r_1 < 1$, which needs to decrease with increase of $\Delta y_1$, as shown in FIG. 11. Certainly, the second function relationship $r_1$-$\Delta y_1$ curve may be set as the optimal according to adjustment effects of various actual scenes during adjustment of image quality.

In combination with the tensile coefficient r and the first degree of deviation r1, $$y_1 = r \times r_1 \times \Delta Y_1 + Y(min)$$
$$= \frac{Y2 - Y1}{Y(max) - Y(min)} \times r_1 \times [Y1 - Y(min)] + Y(min)$$

can be obtained,
wherein Y(max) and Y(min) are constants, values of Y2 and Y1 are decided by a current video dynamic image, and the value of r1 can be found out according to the $r_1$-$\Delta y_1$ curve in FIG. 11.

The first degree of deviation r2 is:

$$r_2 = \frac{\Delta y_2}{\Delta Y_2 \times r},$$

wherein $\Delta y_2 = Y(max) - y2$, $\Delta Y_2 = Y(max) - Y2$, and herein $0 < r_2 < 1$, which decreases with increase of $\Delta y_2$, as shown in FIG. 12. Certainly, the third function relationship $r_2$-$\Delta y_2$ curve may be set as the optimal according to adjustment effects of various actual scenes during adjustment of image quality.

In combination with the tensile coefficient r and the first degree of deviation r2, $$y_2 = Y(max) - r \times r_2 \times \Delta Y_2$$
$$= Y(max) - \frac{Y2 - Y1}{Y(max) - Y(min)} \times r_2 \times [Y(max) - Y2]$$

can be obtained,
wherein Y(max) and Y(min) are constants, values of Y2 and Y1 are decided by a current video dynamic image, and the value of r2 can be found out according to the $r_2$-$\Delta y_2$ curve in FIG. 12.

As shown in FIG. 9, the luminance is level-stretched through $y = f(Y) = c \times Y + b$, stretching is performed within a range of [y1, y2], and y1 and y2 satisfy: Y(min) ≤ y1 < Y1 ≤ Y ≤ Y2 < y2 ≤ Y(max),
there is $$\begin{cases} y1 = c \times Y1 + b \\ y2 = c \times Y2 + b \end{cases},$$

and in combination with y1 and y2 and by solving a system of equations, there is:

$$\begin{cases} c = (y2 - y1)/(Y2 - Y1) \\ b = (y1 \times Y2 - y2 \times Y1)/(Y2 - Y1) \end{cases},$$

that is, an equation of stretching [Y1, Y2] to [y1, y2] is:

$$y = \frac{y2 - y1}{Y2 - Y1} \times Y + \frac{y1 \times Y2 - y2 \times Y1}{Y2 - Y1}.$$

For the dynamic video image, the main distribution range [Y1, Y2] of the luminance is constantly changing, y1 and y2 adapting thereto can be obtained in real time, and values of c and b are obtained finally, thereby dynamically adjusting intercept b and gain c of the luminance, to achieve level stretching of the luminance, which improves light and dark levels and depth of field effects of the image and achieves adaptive dynamic luminance adjustment, and at the same time, according to the luminance adjustment, contrast may also be properly adjusted.

In one preferred embodiment, on the basis of the embodiment of FIG. 14, the stretching module 204 further includes: a synchronization unit, used for synchronously adjusting a blue chrominance component Cb and a red chrominance component Cr.

Level stretching of Y is achieved through the equation $$y = \frac{y2 - y1}{Y2 - Y1} \times Y + \frac{y1 \times Y2 - y2 \times Y1}{Y2 - Y1},$$

and although levels of the luminance within the main distribution range [Y1, Y2] is stretched, at this point, saturation obviously occurs in the luminance in intervals [Y(min), Y1] and [Y2, Y(max)], that is, cut-off occurs, which indicates that level stretching of Y in an interval [Y1, Y2] is established on the basis of sacrificing luminance levels of the intervals [Y(min), Y1] and [Y2, Y(max)].

As separate level stretching for the luminance will change the size of saturation of the pixel points, at this point, it is necessary to synchronously adjust a blue chrominance component Cb and a red chrominance component Cr of the dynamic image.

In this embodiment, when cut-off occurs in the intervals [Y(min), Y1] and [Y2, Y(max)], it is necessary to make $$\begin{cases} Y' = Y(min) \\ Cb' = 0 \\ Cr' = 0 \end{cases} \text{ or } \begin{cases} Y' = Y(max) \\ Cb' = 0 \\ Cr' = 0 \end{cases},$$

wherein Y' is the luminance after Cb and Cr are synchronously adjusted;

when cut-off does not occur, $$k = \frac{c \times Y + b}{Y}$$
$$= \frac{y2 - y1}{Y2 - Y1} + \frac{y1 \times Y2 - y2 \times Y1}{Y(Y2 - Y1)}$$

is set,
and there is:

$$\begin{cases} Y' = c \times Y + b = k \times Y \\ Cb' = k \times Cb \\ Cr' = k \times Cr \end{cases}.$$

So far, synchronous adjustment of Cb, Cr and the luminance has been achieved, to make saturation of respective pixel points of the dynamic image unchanged before and after adjustment.

The above descriptions are merely preferred embodiments of the present invention, and are not intended to limit the patent scope of the present invention. Any equivalent structure or equivalent flow transformation made by using the contents of the specification and the drawings of the present invention, or directly or indirectly applied to other related technical fields, should be likewise included in the patent protection scope of the present invention.

What is claimed is:

1. A method for dynamically adjusting luminance of a dynamic video image, which is applied to an image processing apparatus, wherein the method comprises the following steps:
   acquiring luminance data of pixel points of the dynamic video image;
   performing separate statistical processing on frequencies of first luminance data with the minimum luminance value and second luminance data with the maximum luminance value in the luminance data, to draw a first histogram corresponding to the luminance data after the statistical processing;
   acquiring a main distribution range of luminance according to the first histogram; and
   level-stretching luminance of the dynamic video image according to the first histogram and the main distribution range to dynamically adjust the luminance of the dynamic video image;
   wherein the step of performing separate statistical processing on frequencies of first luminance data with the minimum luminance value and second luminance data with the maximum luminance value in the luminance data, to draw a first histogram corresponding to the luminance data after the statistical processing comprises:
   expanding a luminance range of the luminance data;
   performing separate statistical processing on the frequencies of the first luminance data and the second luminance data, and performing frequency statistics processing on other luminance data except the first luminance data and the second luminance data according to a preset condition;
   generating a second histogram corresponding to the luminance data after the frequency statistics processing; and
   removing first luminance data in a first statistical bar in the second histogram, and removing second luminance data in a last statistical bar, to obtain the first histogram.

2. The method for dynamically adjusting luminance according to claim 1, wherein the step of expanding a luminance range of the luminance data comprises:
   decreasing the minimum luminance value and increasing the maximum luminance value, or decreasing the minimum luminance value, or increasing the maximum luminance value.

3. The method for dynamically adjusting luminance according to claim 1, wherein the step of level-stretching luminance of the dynamic video image according to the first histogram and the main distribution range comprises:
   based on the first histogram and the main distribution range, acquiring a first function relationship between a stretching coefficient r and a first difference ΔY, a second function relationship between a first degree of deviation $r_1$ and a second difference Δy1 of a first tensile curve y1 and a third function relationship between a second degree of deviation $r_2$ and a third difference Δy2 of a second tensile curve y2, wherein the first difference ΔY is a difference of the maximum luminance and the minimum luminance in the main distribution range, the second difference $\Delta y1$ is a difference between luminance on the first tensile curve y1 and the minimum luminance in the first histogram, and the third difference $\Delta y2$ is a difference between the maximum luminance in the first histogram and luminance on the second tensile curve y2;

calculating the first tensile curve y1 based on the first function relationship and the second function relationship, and calculating the second tensile curve y2 based on the first function relationship and the third function relationship; and calculating a tensile curve y based on the first tensile curve y1 and the second tensile curve y2, and level-stretching the luminance of the dynamic video image according to the tensile curve y.

4. The method for dynamically adjusting luminance according to claim 3, wherein the step of level-stretching luminance of the dynamic video image according to the first histogram and the main distribution range further comprises: synchronously adjusting a blue chrominance component Cb and a red chrominance component Cr.

\* \* \* \* \*